United States Patent [19]

Mrenna et al.

[11] Patent Number: 5,128,828
[45] Date of Patent: Jul. 7, 1992

[54] PANELBOARD CIRCUIT BREAKER MOUNTING ASSEMBLY

[75] Inventors: Stephen A. Mrenna, Brighton Township, Beaver County; Joseph R. Manuel, III, Sewickley, both of Pa.

[73] Assignee: Westinghouse Electric Corp., Pittsburgh, Pa.

[21] Appl. No.: 541,665

[22] Filed: Jun. 21, 1990

[51] Int. Cl.$^5$ .............................................. H02B 1/01
[52] U.S. Cl. ..................................... 361/346; 174/66; 200/293; 200/296
[58] Field of Search .............. 361/346, 347, 350, 353, 361/357, 358, 359, 360, 363, 376; 174/66, 67, 57; 200/293, 296, 297

[56] References Cited

U.S. PATENT DOCUMENTS

| | | | |
|---|---|---|---|
| 3,398,249 | 8/1968 | Dessert | 200/168 |
| 3,849,747 | 11/1974 | Mrenna | 355/166 |
| 4,717,987 | 1/1988 | Newmark | 361/351 |
| 4,733,330 | 3/1988 | Tanaka et al. | 361/356 |
| 4,758,724 | 7/1988 | Osika | 200/315 |
| 4,867,408 | 9/1989 | Ozaki | 248/475.1 |
| 4,937,704 | 6/1990 | Link et al. | 361/354 |

Primary Examiner—Leo P. Picard
Assistant Examiner—Bot Ledynh
Attorney, Agent, or Firm—M. J. Moran

[57] ABSTRACT

A mounting tab plate for a panelboard has been designed, so that two such plates can be used in pairs on each pole for gang-mounting of multipole circuit breakers, the plates being fixed on the panelboard on opposite sides by a screw after insertion of the tab in a corresponding groove of the housing of the circuit breaker.

5 Claims, 6 Drawing Sheets

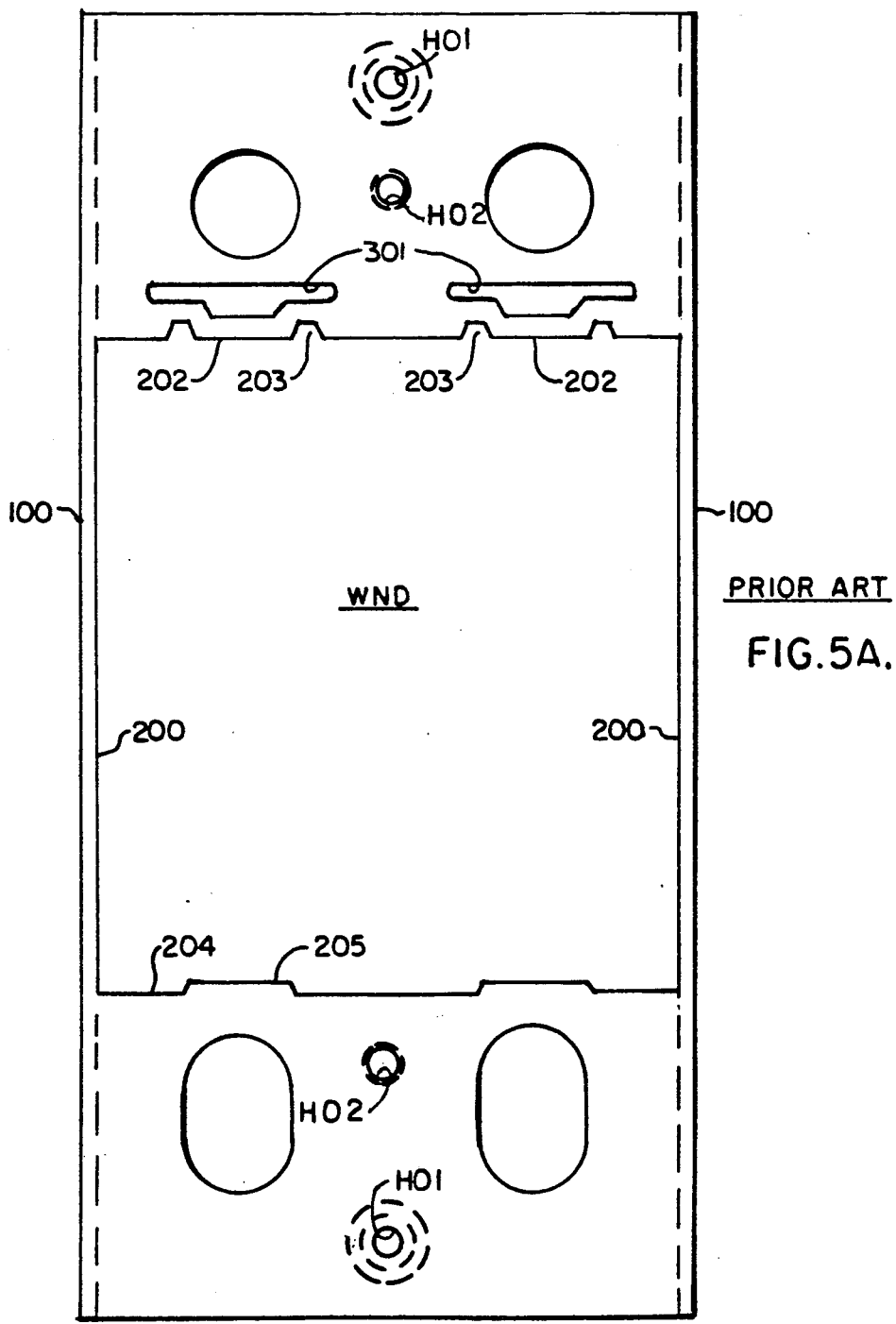

PANELBOARD CIRCUIT BREAKER MOUNTING ASSEMBLY

BACKGROUND OF THE INVENTION

The invention relates to panelboard mounting of circuit breakers in general, and more particularly to the mounting thereon of small size standard circuit breakers, so that they can be either immediately individually placed in position for manual command through the handle, or replaced for future operation on the panelboard.

It is known to mount one or more circuit breakers in the back of a panelboard where there is access to mount, connect, or replace a circuit breaker, this being done so that, once mounted behind the panel board, the handles are projecting outside for manual control by the operator. This has been done with a mounting plate which fits exactly into an opening of the panelboard, such mounting plate being first applied against the front face of the circuit breaker and snapped there into place before the circuit breaker can be, with its mounting plate, placed as a unit into the opening behind the panel board. This approach, however, requires a plate which matches both the face of the circuit breaker and the contour of the panel board opening. Moreover, when two or more circuit breakers are to be placed side-by-side in the opening, one specially designed mounting plate has to be used in each of these different situations.

The object of the present invention is to facilitate circuit breaker mounting on, or circuit breaker dismounting from, a panel board, while allowing gang mounting of circuit breakers side-by-side.

SUMMARY OF THE INVENTION

A mounting assembly is provided for mounting at least one circuit breaker in the opening of a panelboard having an inner surface and an outer surface, the opening having in one dimension a predetermined length. The circuit breaker posseses a front portion defined between two parallel surfaces at a predetermined distance from one another, the operative handle projecting therebetween, such distance being smaller than the opening length. The invention requires only at least one pair of identical plates each having a tab portion at one end and a fixation point at the other end. The two plates are applied and mounted with the assist of the associated fixation point against the inner surface of the panel board, one plate being placed at one end of the opening, the other plate being placed at one end of the opening, so that the respective tab portions are distant by substantially said circuit breaker parallel surface distance. The circuit breaker is mounted into the opening by inserting the front portion so as to fit the unit exactly between the tab portions once in position.

BRIEF DESCRIPTION OF THE DRAWINGS

FIGS. 5A and 5B are front and side views of a mounting plate used in the prior art for mounting, in the opening of a panelboard such as the one of FIG. 2, a two-pole circuit breaker like the one of FIG. 3;

DESCRIPTION OF THE PREFERRED EMBODIMENT

Referring to FIG. 1, a one-pole circuit breaker is shown as seen from the outside of its housing. This circuit breaker is fully described in U.S. Pat. No. 4,620,076. This patent is hereby incorporated by reference.

The circuit breaker proper includes in a housing at least a movable contact and a fixed contact which are to be closed for interconnecting a line terminal and a load terminal. The contacts are controlled by a handle 1 projecting outside of the housing. The circuit breaker also includes, as generally known, an operating mechanism, tripping and overload overriding means to command contact separation, the operative step of which is timed if there is an overload, or without any delay if a more critical tripping condition occurs between line and load. The mechanical and electrical elements are placed, assembled and functionally interconnected within the housing for protection, insulation and compactness.

Figure 1C:
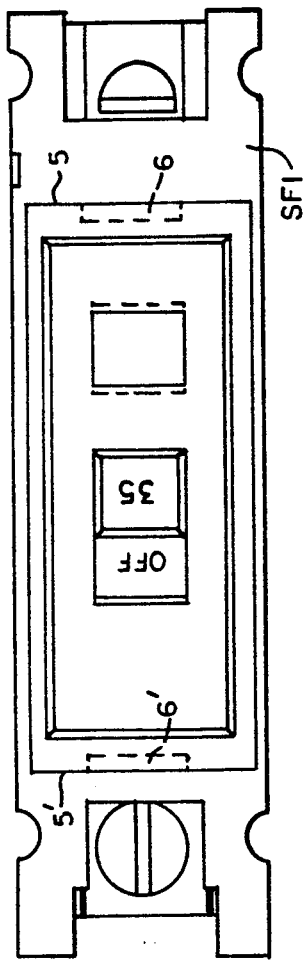
FIGS. 1A, 1B and 1C are the side, end and front views, respectively, of a one-pole circuit breaker as seen from the outside of its housing.
Figure 1A:
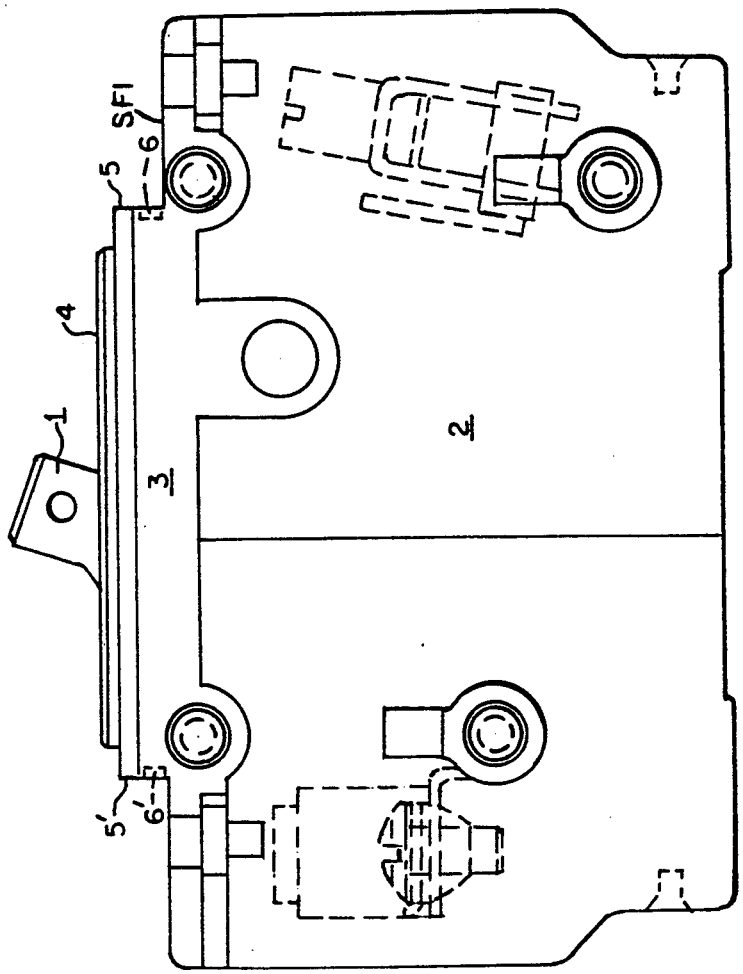
Figure 1B:
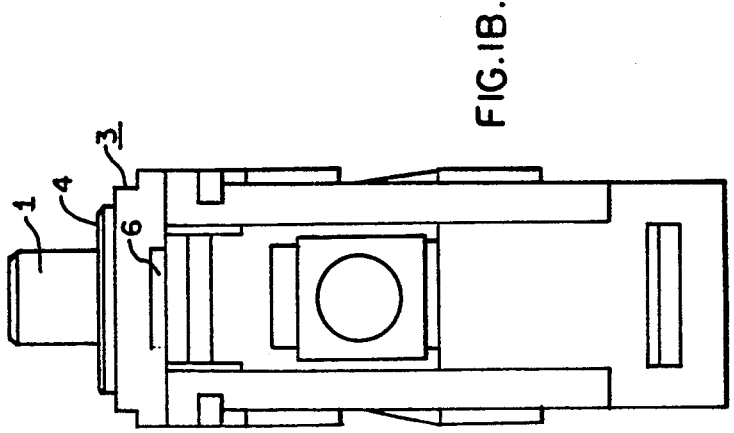

Typically, as shown in FIG. 1, the housing 2 comprises a main compartment 2 and a front cover having a projecting portion 3. The handle 1 extends outside of the housing through an opening of the projecting portion 3. As explained hereinafter, the present invention takes advantage of the fact that the housing has a projecting portion surrounding the handle 1, and that such projecting portion, shown in FIGS. 1A to 1C, offers: 1) opposite parallel planes 5 and 5'; 2) normal to a planar surface SF1 surrounding the projecting portion; and 3) recesses, or grooves 6 and 6' existing within the housing at the base of each of the surfaces 5 and 5' near the planar surface SF1.

Figure 2:
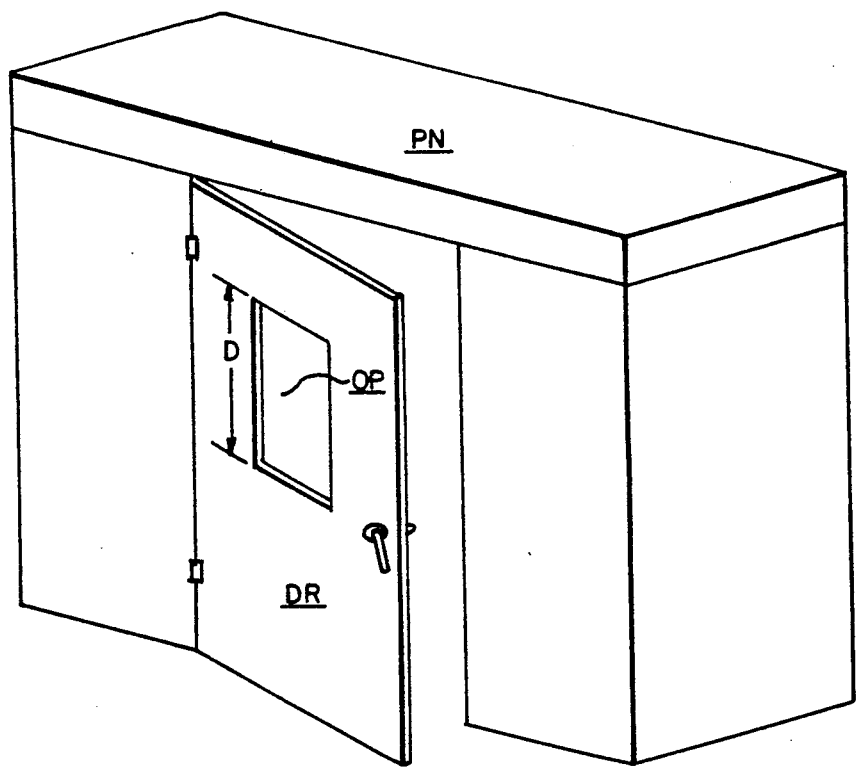
FIG. 2 illustrates a panelboard with an open door provided with an opening, or window, inside which the circuit breaker of FIG. 1 is to be mounted.

The object of the present invention is to mount the housing with its length vertically disposed so that the frontal projecting portion 3 appear in full sight on the panelboard for handling in situ by an operator. FIG. 2 shows illustratively a panel PN having a door DR possessing an opening OP into which the housing of the circuit breaker of FIG. 1A to 1C is to be mounted. The door opening OP has a vertical dimension D which is larger than the width d existing between the two planes 5 and 5' of the projecting portion 3 of the circuit breaker housing. Once the housing containing the circuit breaker has been placed inside the door, the circuit breaker is operatively connected with the terminals of the line and load within the panelboard. Then, the door is closed and the handle becomes readily available for manual control by the operator from the outside.

Figure 3:
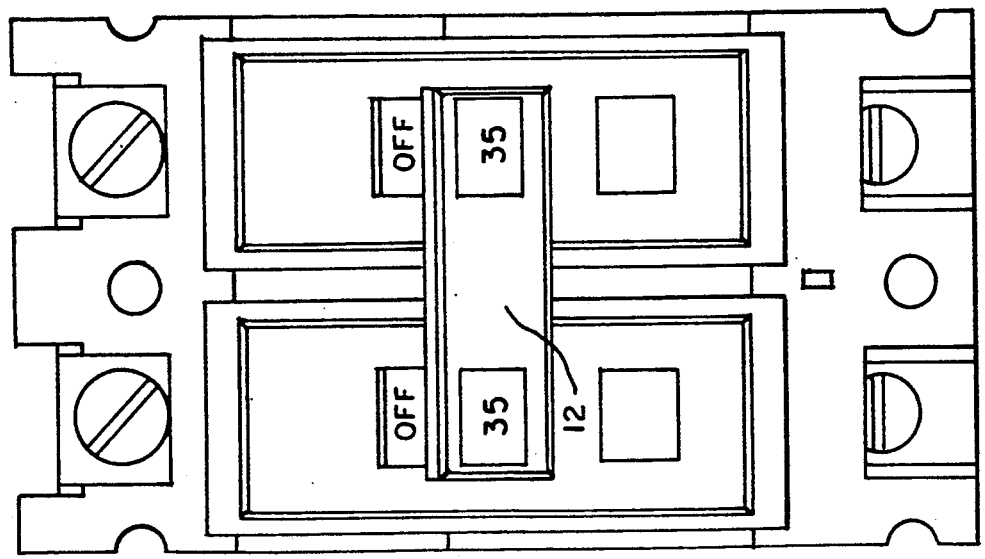

FIG. 3 shows a two-pole circuit breaker, namely having two housings such as shown in FIGS. 1A to 1C mounted side by side with their two handles linked for common handling by a bar 12.

Figure 4:
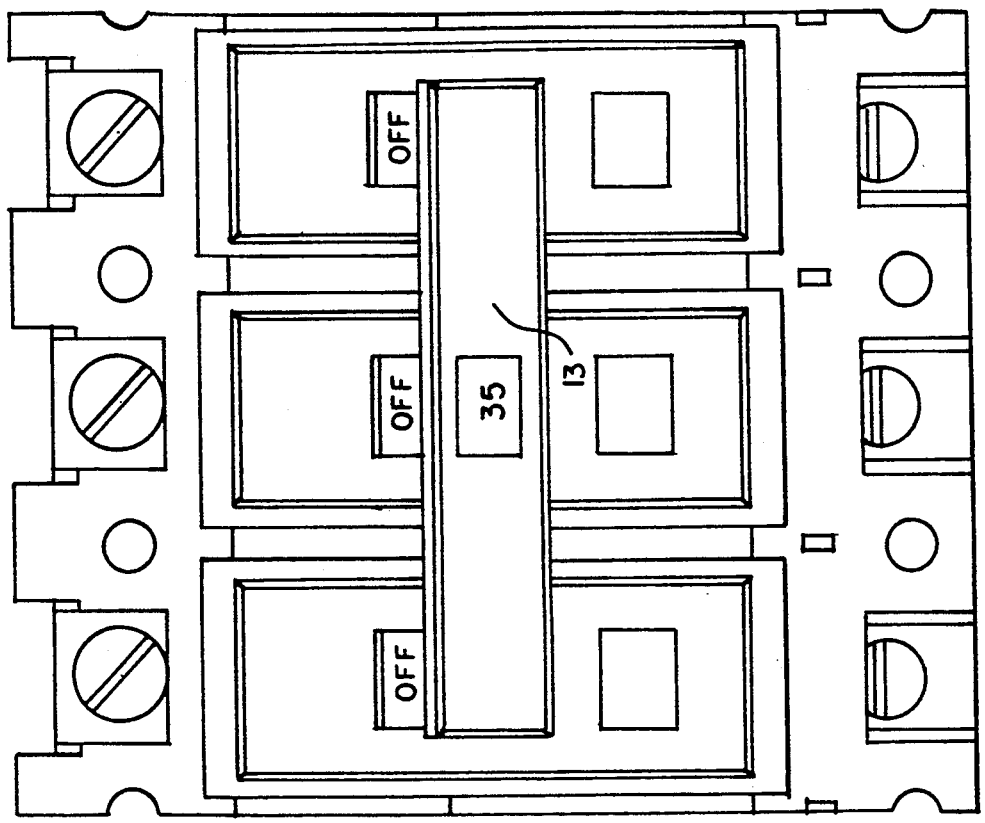
FIGS. 3 and 4 are illustrative of two-pole and three-pole circuit breakers, respectively, combining single pole housings, like the one of FIG. 1, disposed side-by-side for common manual handling.

FIG. 4 is like FIG. 3, but shows a three-pole circuit breaker, thus, including three housings gang-mounted with their three respective handles linked together by a bar 13.

Figures 6A, 6B:
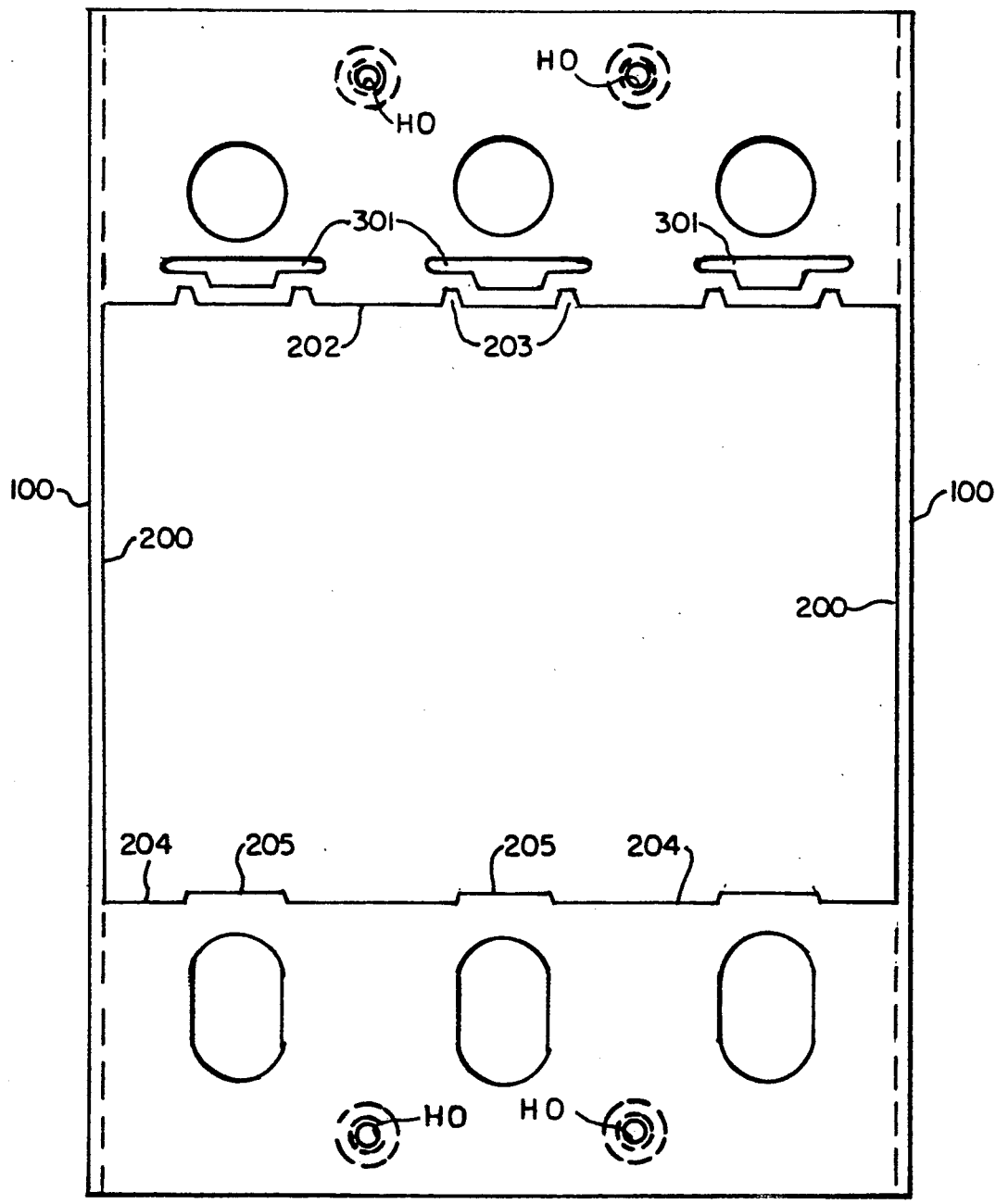
FIGS. 6A and 6B are front and side views of a mounting plate of the prior art in the case of a three-pole circuit breaker.

FIGS. 5A and 5B illustrate the front and side views of a prior art mounting plate as has been used for circuit breaker insertion and holding across the opening of a panelboard, such as opening OP of door DR of FIG. 2. Typically, the plate PT is provided with at least two opposite holes centrally disposed above and below a central window WND for passing a screw when mounting the plate on the panelboard. Two paris of holes (HO1 and HO2, respectively) are shown illustratively to provide for mounting two types of circuit breakers of different housing dimensions. The two more distant holes HO1 are intended for the larger one, the two holes HO2 which are closer to the edge of the window WND are intended for the smaller housing. The window WND is designed to match the contour of the frontal projection 3 of the circuit breaker housing. The plate PT is designed so as to exceed by its rectangular contour 100 the longitudinal dimension D of the opening OP of the panelboard and to allow the upper and lower holes to be matched with corresponding holes in the panelboard for screwing plate and panelboard together. As shown by the sideview of FIG. 5B, the longitudinal edge 100 is bent backward all along its length so as smooth the overall layoff of the circuit breaker once mounted. The window WND is chosen to accommodate the joined projecting portions 3 of the two-pole circuit breaker housing of FIG. 3. This window posseses an edge 200 closely paralleling the longitudinal outside edge 100. It has also transversal upper and lower edges 202 and 204. The lower edge of window WND has a tab 205 transversely disposed across the vertical axis associated with each pole housing. The upper edge 202 is indented at four places 203 to be aligned by pairs with the edging sides of tabs 205. The plate is provided with two transversal openings 301, each bordering a corresponding one of the afore-stated pairs of indentures into edge 202. These openings 301 are elongated and narrow like grooves. Moreover, each possesses one lateral adjoining open space forming like a notch toward the 202 edge side. The purpose of openings 301 is to engage and situate along a vertical axis a corresponding side projection found on the associated frontal area of one of the housings of the two-pole unit. With such an arrangement, while being initially tilted, the plate is, first, applied against the frontal side of circuit breaker so that the two lower tabs can enter the respective matching grooves of the housing projection and, secondly, it is pushed into parallelism with the frontal plane of the projection of the circuit breaker until the two openings 301 have become fully engaged with the housing side projections of the circuit breaker. In this manner, the mounting plate of FIGS. 5A and 5B, becomes securely fixed as a front plate covering the frontal side of the circuit breaker while allowing the two main projections to appear with their handles across the window WND. The mounting plate PT, while being securely fastened to the circuit breaker, is nonetheless amovable through a reverse process for demounting. It remains to place the circuit breaker with its mounting plate into the opening OP of the panelboard PN and to fix the assembly with screws through the holes on the panelboard. As it appears, each mounting plate PT must be designed specially for complementarity with the front projection of the housing in such two-pole circuit breaker, as well as with the opening OP of the panelboard. The same can be said of the mounting plate for a three-pole circuit breaker as shown in FIG. 4. Such a mounting plate is illustrated by FIG. 6A and 6B. Here, three tabs 205 are provided, each matching, along the lower edge 204 of a three-pole window WND, a corresponding one of the respective side projections of the three parallel housings to be gang-mounted in the opening OP. Similarly, there are three transversal openings 301 associated with three pairs of indentures 203 along the upper edge 202 of the window WND. Otherwise, the mounting plate has a corresponding width, while the height is the same as for FIGS. 5A and 5B, according to the vertical dimensions of the opening OP and of the housing of the circuit breaker. Once the three-pole has been hooked with its mounting plate, these can be inserted as a unit into opening OP and the plate be fixed with screws on the panelboard by its holes HO.

Figure 7:
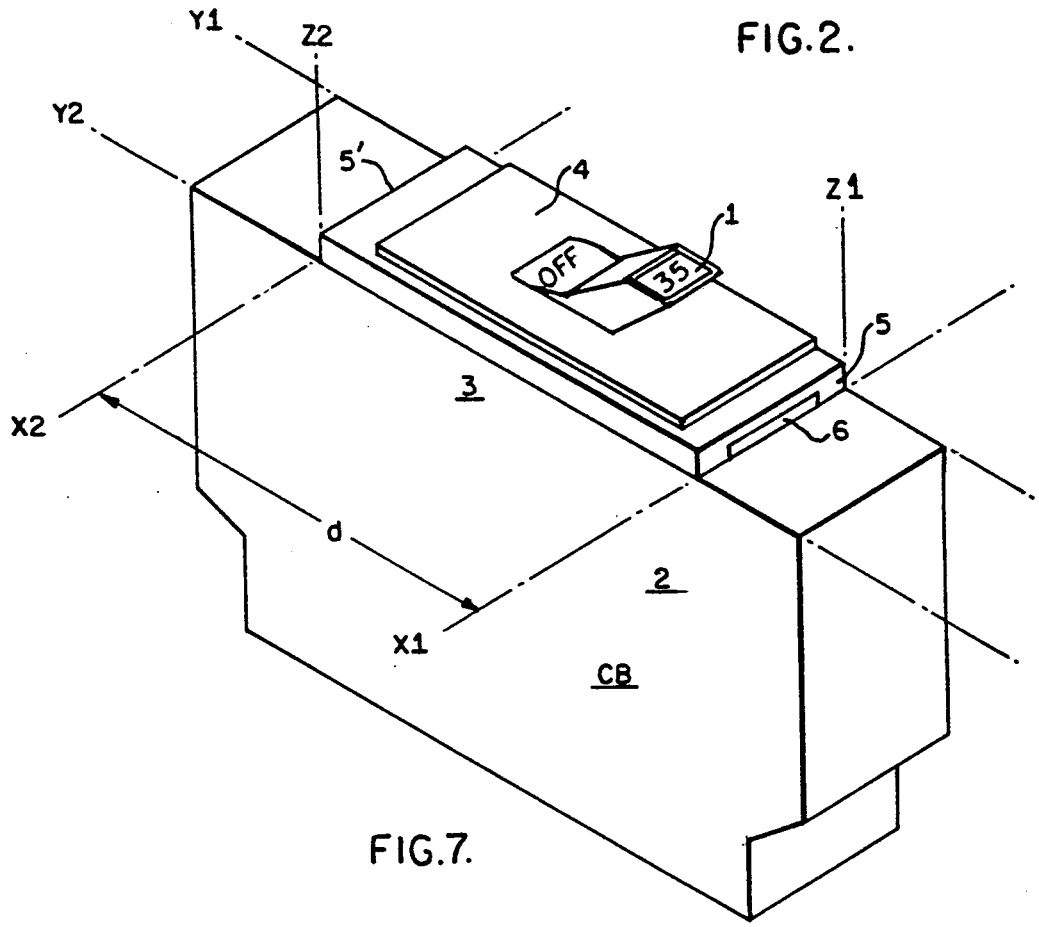
FIG. 7 is an isometric view of the one-pole circuit breaker of FIGS. 1A to 1C.

FIG. 7 is an isometric view of the one-pole circuit breaker CB of FIGS. 1A to 1C. The frontal projection 3 appears defined between two opposite lateral faces 5 and 5' each having a recess, or groove 6 at its base. Each such groove is adjoining the main frontal plane of the main housing body which is defined by two parallel axes Y1 and Y2. Each of the lateral faces 5 and 5' is defined by one axis (respectively, X1 or X2), normal to the plane of axes Y1 and Y2, and by an orthogonal axis: Z1 for face 5, Z2 for face 5'. The distance between axes X1, X2 is d. The handle 1 is shown projecting outside the frontal plane 4 of the projecting portion 3 of the housing 2.

In contrast to the mounting plates of the prior art, according to the present: invention a single type of plate is now proposed which can be used for a one-pole, a two-pole, or a three-pole circuit breaker. Two identical plates per pole are being used to provide, from two opposite sides of the projecting portion of the housing, a tight squeeze holding the circuit breaker from within the window of the panelboard.

Figure 8A:
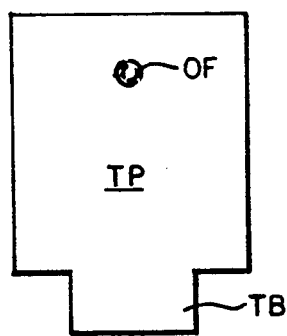
FIGS. 8A and 8B are front and side views of a tab plate according to the present invention.
Figure 8B:
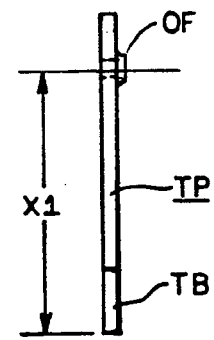

One of the twin plates according to the present invention is shown by FIGS. 8A and 8B, which are front and side views, respectively. As shown, plate TP is generally rectangular with a relatively small thickness, and posseses a tab portion TB projecting beyond one of the four edges. This tab is intended to be engaged into the recess, or groove 6, or 6', of one face (5, or 5') of the housing frontal projection 3 for one-pole (FIG. 7). Instead of being mounted beforehand on the circuit breaker, the plate TP is mounted and fixed on the inner surface of the panelboard. The circuit breaker will be inserted between two such panelboard-mounted plates and held in position across the window by the two tabs, one above, the other below. The tab plate has a hole HO provided on its central axis toward the edge opposite to the tab TB. The tab plate TP is designed as a function of the dimensions of the circuit breaker housing and of the opening OP of the panelboard.

Figure 9:
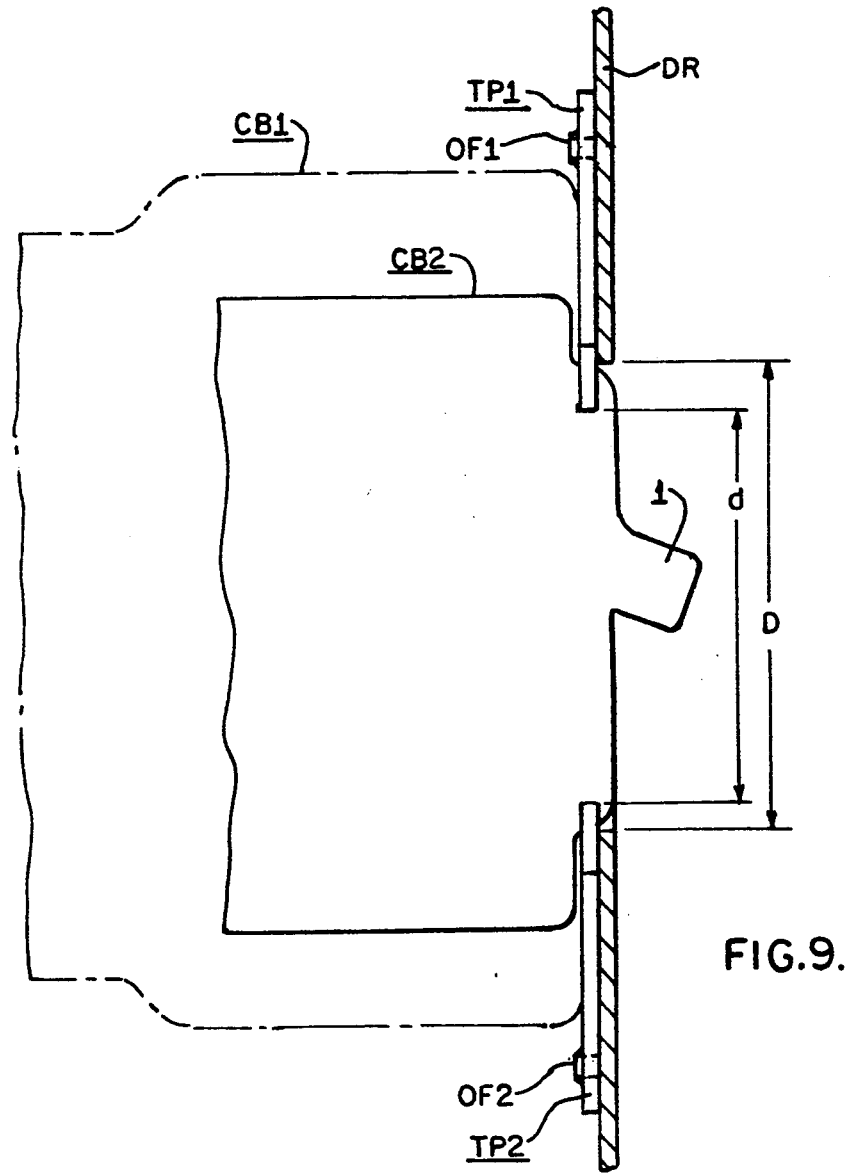
FIG. 9 shows the profiles of two possible circuit breakers mounted in the opening of a panel board with the assist of two tab plates according to the present invention.

FIG. 9 shows the door DR of the panelboard PB in cross-section. The profiles of two different circuit breakers with their housings, CB1 or CB2, are illustratively and schematically shown mounted against the inner surface of the door with the projecting portion 3 of the housing across the opening OP of the door, once in position. The handle 1 of the circuit breaker, in either instance, appears free for manual handling from the outside. An upper tab plate TP1 and a lower tab plate TP2 are mounted on the door at two respective levels, against the inner surface of the door, and situated on opposite sides of the opening OP of the door. The two plates with their tabs extend into the opening, thereby reducing the opening vertical dimension from D to d. It is assumed that the circuit breakers CB1 and CB2 each are one-pole circuit breakers, much like the one shown in FIG. 7, and that they have a prominent portion 3 extending between two opposite lateral surfaces 5 and 5' which are distant from one another by the distance d. Distance d is assumed to be smaller than the distance D existing between the upper and the lower edges of the opening of the panel door. The upper tab of TP1 is shown engaging surface 5 of the circuit breaker housing (of CB1 or CB2) while the lower tab of plate TP2 engages surface 5' of the circuit breaker housing (of CB1 or CB2). At the same time, the two shoulders of the housing, which are flat surfaces laying in a main plane, are resting against the inner surface of the door. If any play has been minimized between housing and tabs, thanks to a close estimation of how the two tabs, once screwed or bolted at two respective levels, should be matching the opposite lateral surfaces 5, 5' of the projecting portion 3, once the housing has been inserted inside the opening OP, no lateral movement of the casing will be possible, and the circuit breaker will be well fastened in place by the two tabs, as well as under the interaction of the inner surface of the door against the adjacent surface of the housing in a common plane. No other degree of freedom will be left than when choosing to tilt and pull back the entire circuit breaker, with its housing, in order to remove it from behind the door by disengaging the tabs from their respective surfaces 5 and 5', quasi simultaneously. It is also observed that, after the circuit breaker has been positioned on the back of the door, as just explained, the circuit breaker will be electrically connected by the operator to the terminals. Accordingly, the overall circuit breaker will have become mechanically attached to and integrated with the panel board and ready for operation and handling by the operator. The design of the plates takes into account the distances d and D, as well as the outside dimension of the circuit breaker so that the orifice OF of the plate TP be at a distance x1 from the transversal tab edge such as to fall outside of the housing of the circuit breaker (CB1 or CB2 of FIG. 9).

Indeed, when gang mounting two or three housing, twin plates such as TP1 and TP2 are paired for each pole. The orifices OF1, OF2 will be positioned on the inner surface of the door so as to match the widths of the associated circuit breakers. The invention allows to have each housing joined closely against the neighboring one. It is also observed that, although the tab portions have been shown in the best embodiment of the invention as engaging a recess or groove 6, 6', it is also possible to merely have the edge of the tab engage tightly the plane of the face 5 or 5' of the projecting portion 3 of the housing if this one has no such recess or groove. A good matching of the edge with the plane would insure a good holding of the housing in place within the opening OP. Moreover, the door DR of the panelboard with its opening OP is only illustrative. The circuit breaker may be mounted with the tabs fixed on a window wherever necessary on the panelboard.

We claim:

1. In a mounting assembly for mounting at least one circuit breaker in the opening of a planar panelboard having parallel inner and outer surfaces both traversed by one screw hole placed a distance from the opening by a first predetermined length, the opening having opposite end surfaces separated by a second predetermined length; the circuit breaker having a front portion defined by two parallel surfaces distant by a third predetermined length and containing an operative handle projecting therefrom; said third predetermined length being smaller than said second predetermined length;

the combination of:

at least one pair of plates; each plate having in the same plane a tab portion ending with a transversal edge and being provided with an orifice placed centrally on an axis normal to said transversal edge and a distance therefrom equal to said first predetermined length plus half the difference between said second and third predetermined lengths;

each plate being mounted against the inner surface of the panelboard by means of a screw passed through corresponding ones of said panelboard screw holes and of said panelboard orifices; and the circuit breaker being mounted in said panelboard opening by inserting said front portion between said tab portions.

2. The mounting assembly of claim 1 for a two-pole circuit breaker mounting; with two circuit breakers being mounted side by side into said opening with two of said pairs of plates, one pair of each circuit breaker.

3. The mounting assembly of claim 1 for a three-pole circuit breaker mounting; with three circuit breakers being mounted side by side into said opening with three of said pairs of plates, one pair for each circuit breaker.

4. The mounting assembly of claim 1 wherein a recess is provided in each of the parallel surfaces of said front portion of the circuit breaker; said tab portion being dimensioned to mate with said recess.

5. The mounting assembly of claim 4 with the circuit breaker being mounted into the opening first with one tab portion of a plate being inserted in a corresponding one of said parallel surface recesses, and secondly with the other tab portion being snapped into place with the other parallel surface recess of the circuit breaker.

* * * * *